US008060256B2

(12) United States Patent
Kong et al.

(10) Patent No.: US 8,060,256 B2
(45) Date of Patent: Nov. 15, 2011

(54) APPARATUS, METHOD, AND MEDIUM FOR LOCALIZING MOVING ROBOT AND TRANSMITTER

(75) Inventors: Dong-geon Kong, Yongin-si (KR); Seok-won Bang, Seoul (KR); Hyeon Myeong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1136 days.

(21) Appl. No.: 11/822,438

(22) Filed: Jul. 5, 2007

(65) Prior Publication Data

US 2008/0009974 A1 Jan. 10, 2008

(30) Foreign Application Priority Data

Jul. 7, 2006 (KR) .................. 10-2006-0064054

(51) Int. Cl.
*G05B 15/00* (2006.01)
*G05B 19/00* (2006.01)
(52) U.S. Cl. .......... 700/258; 700/245; 700/262; 701/23; 701/300; 701/301; 367/118; 367/128; 318/568.12; 318/568.16
(58) Field of Classification Search .......... 700/245, 700/250, 258, 262; 318/568.1, 568.11, 568.12, 318/568.16; 367/118, 128; 701/23, 25
See application file for complete search history.

(56) References Cited

U.S. PATENT DOCUMENTS

| | | | | |
|---|---|---|---|---|
| 5,446,356 A | * | 8/1995 | Kim ................ | 318/587 |
| 5,491,670 A | * | 2/1996 | Weber ............. | 367/127 |
| 6,459,955 B1 | * | 10/2002 | Bartsch et al. ..... | 700/245 |
| 6,748,297 B2 | * | 6/2004 | Song et al. ........ | 700/259 |
| 6,868,307 B2 | * | 3/2005 | Song et al. ........ | 700/245 |
| 2004/0158354 A1 | * | 8/2004 | Lee et al. ......... | 700/245 |
| 2004/0199301 A1 | * | 10/2004 | Woo et al. ......... | 701/1 |
| 2005/0010330 A1 | * | 1/2005 | Abramson et al. .... | 700/245 |
| 2005/0171636 A1 | * | 8/2005 | Tani .............. | 700/245 |

(Continued)

FOREIGN PATENT DOCUMENTS

JP 2000-056006 2/2000

(Continued)

OTHER PUBLICATIONS

Kim et al., Robot Localization using Ultrasonic Sensors, IEEE, proceedings of IEEE/RSJ International Conference on Intelligent Robots and Systems, Sep. 28-Oct. 2, 2004, Sendai, Japan, pp. 3762-3766.*

(Continued)

*Primary Examiner* — Khoi Tran
*Assistant Examiner* — Jamie Figueroa
(74) *Attorney, Agent, or Firm* — Staas & Halsey LLP

(57) ABSTRACT

Provided are an apparatus allowing a moving robot to localize a user, or localizing the moving robot from a fixed location, and a method and medium thereof. The apparatus includes a motion controller to control the moving robot such that the sensor passes a plurality of measurement points by rotating the moving robot, a distance measuring unit, which includes the sensor that senses predetermined waves generated from the transmitter, to measure distances between the sensor and the transmitter at the plurality of measurement points, a rotational angle measuring unit to measure rotational angles of the moving robot at the measurement points, and a location calculator to calculate relative locations using input values of the measured distances, the measured rotational angles, and the radius of a circle determined by the sensor resulting from the rotation of the moving robot.

27 Claims, 12 Drawing Sheets

U.S. PATENT DOCUMENTS

2005/0267631 A1 * 12/2005 Lee et al. .................... 700/245

FOREIGN PATENT DOCUMENTS

| JP | 2003-262520 | 9/2003 |
| JP | 2005-211359 | 8/2005 |
| KR | 20-0321249 | 7/2003 |
| KR | 10-2004-0023421 | 3/2004 |
| KR | 10-2004-0087176 | 10/2004 |
| KR | 10-2005-0011568 | 1/2005 |
| KR | 10-2006-0011552 | 2/2006 |
| KR | 10-0575706 | 4/2006 |
| KR | 10-2006-0068968 | 6/2006 |

OTHER PUBLICATIONS

Notice of Allowance dated Oct. 25, 2007, issued in corresponding Korean Patent Application No. 10-2006-0064056.
Korean Intellectual Property Office Notice of Examination issued Apr. 30, 2007 in corresponding Korean Patent No. 10-2006-0064054.

* cited by examiner

APPARATUS, METHOD, AND MEDIUM FOR LOCALIZING MOVING ROBOT AND TRANSMITTER

CROSS-REFERENCE TO RELATED APPLICATIONS

This application claims priority benefit of Korean Patent Application No. 10-2006-0064054 filed on Jul. 7, 2006 in the Korean Intellectual Property Office, the disclosure of which is incorporated herein by reference in its entirety.

BACKGROUND

1. Field

Embodiments relate to a moving robot, and more particularly, to an apparatus, method, and medium for localizing a user by a moving robot or localizing a moving robot from a fixed point.

2. Description of the Related Art

In general, robots have been developed for industry and used for factory automation, or used to substitute humans to operate in extreme environments in which it is unsafe for humans. Robots are even being used for the state-of-the-art aerospace industry and more and more uses of robotic technology are being developed. As a result, human-friendly domestic robots have been developed in recent years. In addition, robots are substituted for medical instruments and used to medically treat micro human biologic tissues that cannot be treated by conventional medical instruments in a human body. Because of remarkable developments, robotics is in the spotlight as a state-of-the-art technological field that is expected replace the information revolution and biotechnology, which followed the information revolution.

In particular, a domestic robot is the leading robot that expands the past field of heavy industry-centered robotics limited to industrial robots into a new field of light industry-centered robotic technology. A cleaning robot is one example of domestic robots. A cleaning robot typically includes a driving unit for movement, cleaning unit for cleaning, and a location detecting unit for detecting a location (hereinafter, referred to as localization) of itself or a user (remote control).

Supersonic sensors are usually used as localizing units. The localizing unit measures the distance between a transmitter and a receiver using several sensors and localizes an object by applying trigonometry to the measured distance. As an example in the related art, a localization apparatus is disclosed in Korean Patent Application Publication No. 2006-0011552 (Title of the Invention: Mobile Robot And His Moving Control Method) of LG Electronics Inc, as shown in FIG. 1, which includes supersonic sensors 12a to 12h mounted on the surface of a moving robot 10 and a RF receiver 11 disposed on the center of the moving robot 10.

In the Korean Patent Application Publication, the moving robot 10 and the remote control 20 are synchronized by the RF transmitter 21 provided to the remote control 20, the supersonic sensors 12a to 12h measure travel times of supersonic waves transmitted from a supersonic generator 22 provided in the remote control 20 and calculates the distances, and a user or the remote control 20 is localized by applying trigonometry to the calculated distances.

As seen from the configuration described above, in order to localizing objects using trigonometry, a plurality of supersonic sensors should be mounted in a moving robot. Accordingly, in addition to increase of cost in manufacturing, the design of a moving robot is restricted due to the sensors mounted on the surface of the moving robot. Further, when the sensitivities of several supersonic sensors mounted on a moving robot are different, considerable errors may be caused in localizing the moving robot.

Therefore, it is needed to devise a method of localizing a moving robot using a single receiving sensor.

SUMMARY

Embodiments provide an apparatus, method, and medium for localizing a moving robot or a user using a single receiving sensor.

According to an aspect, there is provided an apparatus for localizing a moving robot and a transmitter using a single sensor provided in the moving robot, the apparatus including a motion controller to control the moving robot such that the sensor passes a plurality of measurement points by rotating the moving robot, a distance measuring unit, which includes the sensor that senses predetermined waves generated from the transmitter, to measure distances between the sensor and the transmitter at the plurality of measurement points, a rotational angle measuring unit to measure rotational angles of the moving robot at the measurement points, and a location calculator to calculate relative locations using input values such as the measured distances, the measured rotational angles, and a radius of a circle determined by the sensor resulting from the rotation of the moving robot.

According to another aspect, there is provided a method of localizing a moving robot and a transmitter using a single sensor provided in the moving robot, the method including controlling the moving robot such that the sensor passes measurement points by rotating the moving robot, measuring distances between the sensor and the transmitter at the measurement points using the sensor that senses predetermined waves generated from the transmitter, measuring rotational angles of the moving robot at the measurement points; and calculating relative locations using input values including the measured distances, the measured rotational angles, and a radius of a circle determined by the sensor resulting from the rotation of the moving robot.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of the embodiments, taken in conjunction with the accompanying drawings of which.

DETAILED DESCRIPTION OF EMBODIMENTS

Figure 1:
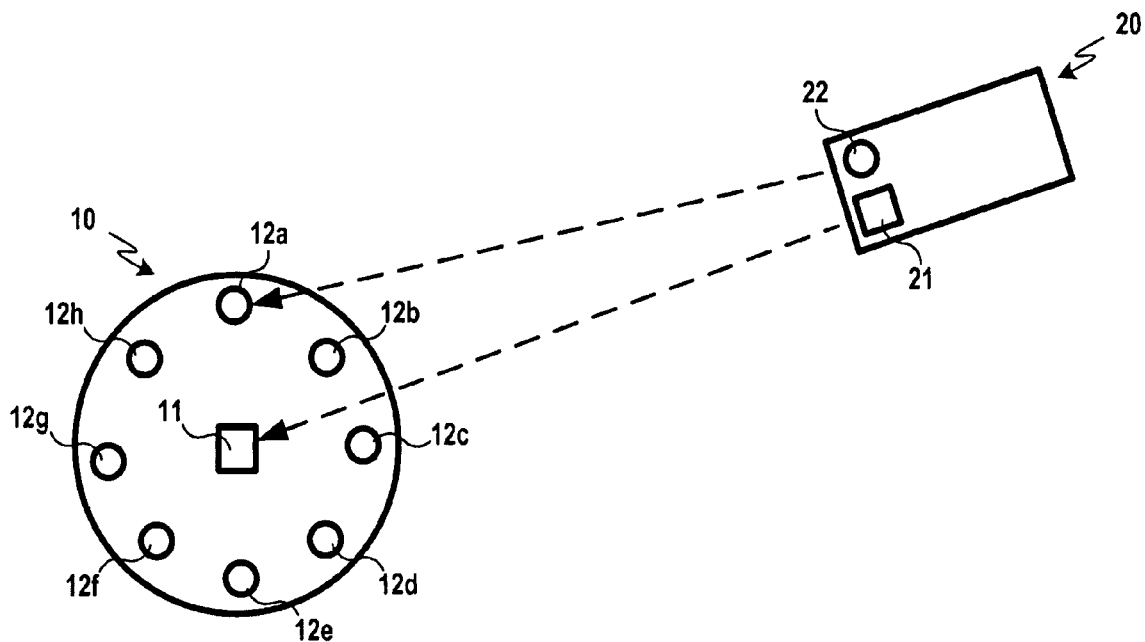
FIG. 1 is a view illustrating an example of localizing technology using a plurality of supersonic sensors in the related art.

Reference will now be made in detail to exemplary embodiments, examples of which are illustrated in the accompanying drawings, wherein like reference numerals refer to the like elements throughout. Exemplary embodiments are described below referring to the figures.

Exemplary embodiments provides a method of localizing a moving robot (relative to a fixed location) or a user (relative to the moving robot) using a receiving sensor (e.g. supersonic sensor) and a measuring unit for a rotational angle of the moving robot, such as an encoder or a gyroscope that is generally mounted in the moving robot. However, the difference in the localizing of the moving robot and the user is just what the reference is, and the technical objects are the same. A relative location between the moving robot and a transmitter herein implies location of the robot and the transmitter relative to each other.

The transmitter may be a device, such as movable remote control, which transmits synchronous signals and supersonic waves to a moving robot 100, and also may be a fixed device such as a beacon. However, a remote control is described herein by way of an example for the transmitter.

Figure 2:
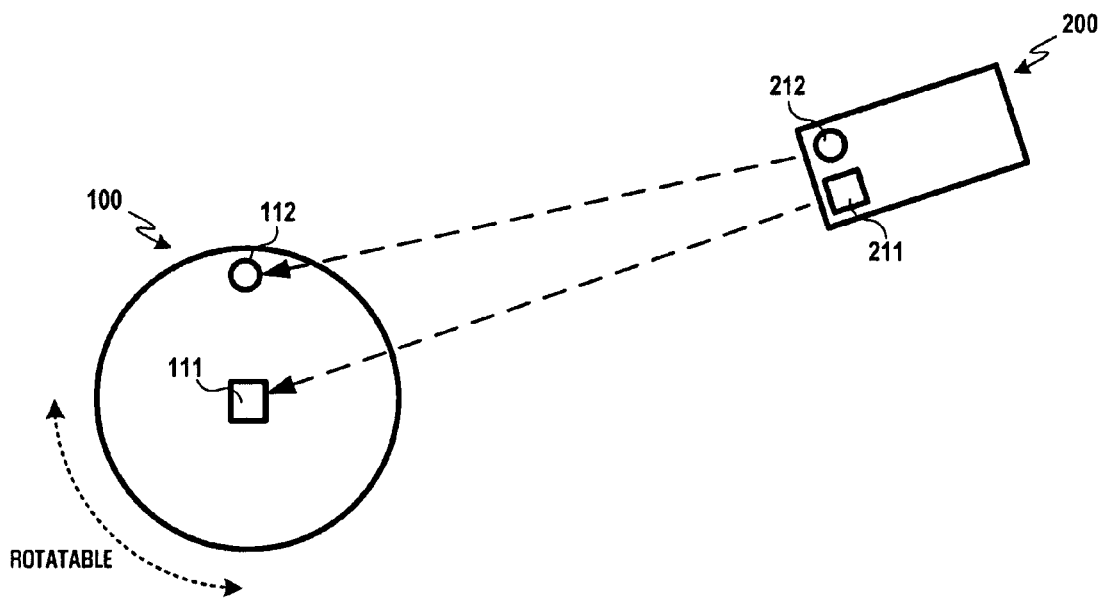
FIG. 2 is a view schematically showing the configuration of a system according to an exemplary embodiment.

The technical configuration of an exemplary embodiment may be, as shown in FIG. 2, broadly separated into two parts, a moving robot 100 and a remote control 200. The remote control 200 is provided with an IR (infra-red)/RF (radio frequency) transmitter 211 for measuring a synchronous time and a supersonic wave transmitter 212.

The moving robot 100 is provided with an IR/RF receiver 111 and a supersonic wave receiving sensor 112. The moving robot 100 is also provided with a motion controller that controls the motion of the robot and an encoder or a gyroscope that measures the rotational angle of the robot. The motion controller controls driving wheels to move or rotate the moving robot 100. A mechanical unit well known in the art may be used as a mechanism for the movement or rotation in exemplary embodiments. In respect to the center, the sensor 112 is disposed near the edge. The sensor 112 is disposed at the front of the robot 100 in the following exemplary embodiments, but the sensor 112 may be placed in another location.

Figure 3:
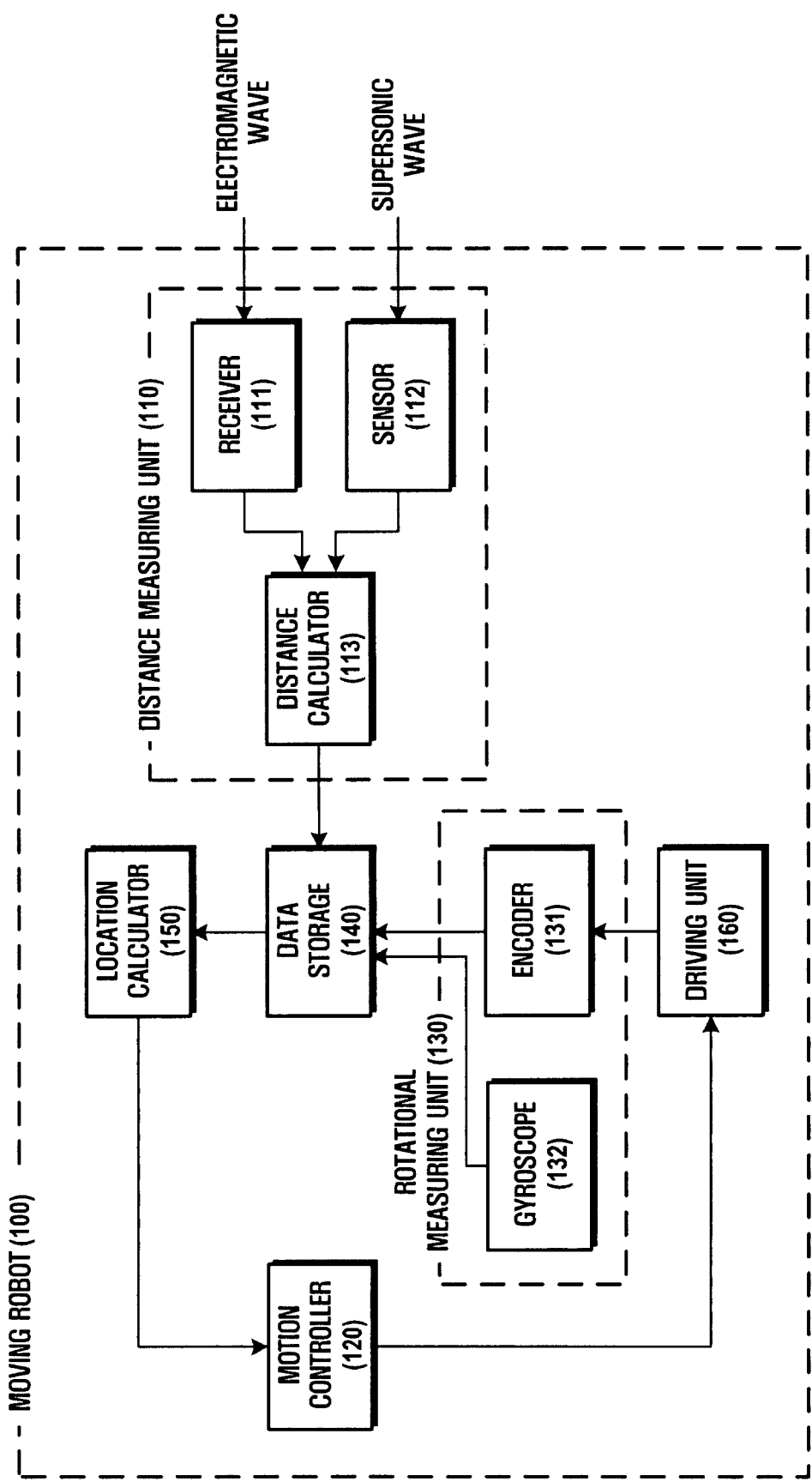
FIG. 3 is a block diagram illustrating the configuration of a moving robot according to an exemplary embodiment.

FIG. 3 is a block diagram showing the configuration of the moving robot 100 and a localizing apparatus according to an exemplary embodiment. The moving robot 100 may include a distance measuring unit 110, a motion controller 120, a rotational angle measuring unit 130, a data storage 140, a location calculator 150, and a driving unit 160.

The driving unit 160 provides driving force to the moving robot 100 through the control of the motion controller 120 so that the moving robot 100 can move. The driving unit 160 typically includes several driving wheels and a steering system, but may be other common driving units allowing the robot 100 to be movable. Further, the driving unit 160 can rotate the moving robot 100 by a specific angle from the center of the moving robot 100 by steering the driving wheels through the control of the motion controller 120. However, another mechanism known in the art other than the driving unit 160 may be used to rotate the moving robot 100 as described above.

Figure 4:
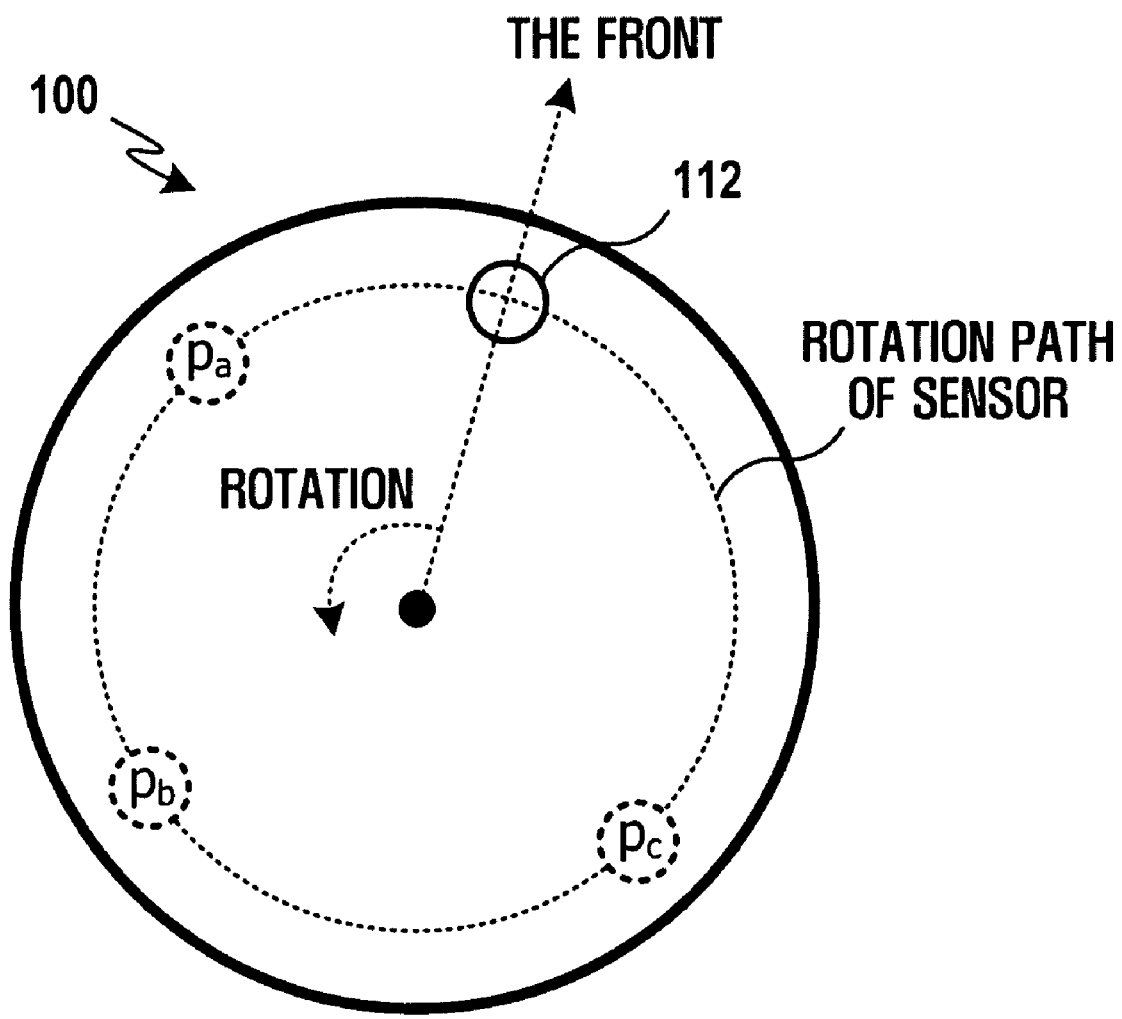
FIG. 4 is a view showing a path of a sensor constructed by rotation of a moving robot, and measurement points.

Because three measurement points on the moving robot 100 are needed to localize the moving robot 100 or the remote control 200, as shown in FIG. 4, the sensor 112 needs to be rotated such that the sensor 112 passes three measurement points $p_a$, $p_b$, and $p_c$. The three measurement points may be optional, but it is preferable that they are more distant from one another for more exact localization. For example, the angle between one measurement point and another may be set to 120°.

The rotational angle measuring unit 130 measures a rotational angle of the moving robot 100 rotated by the driving unit 160. The gyroscope 132, the encoder 131, or combination of them may be used to measure the rotational angle.

Figure 5:
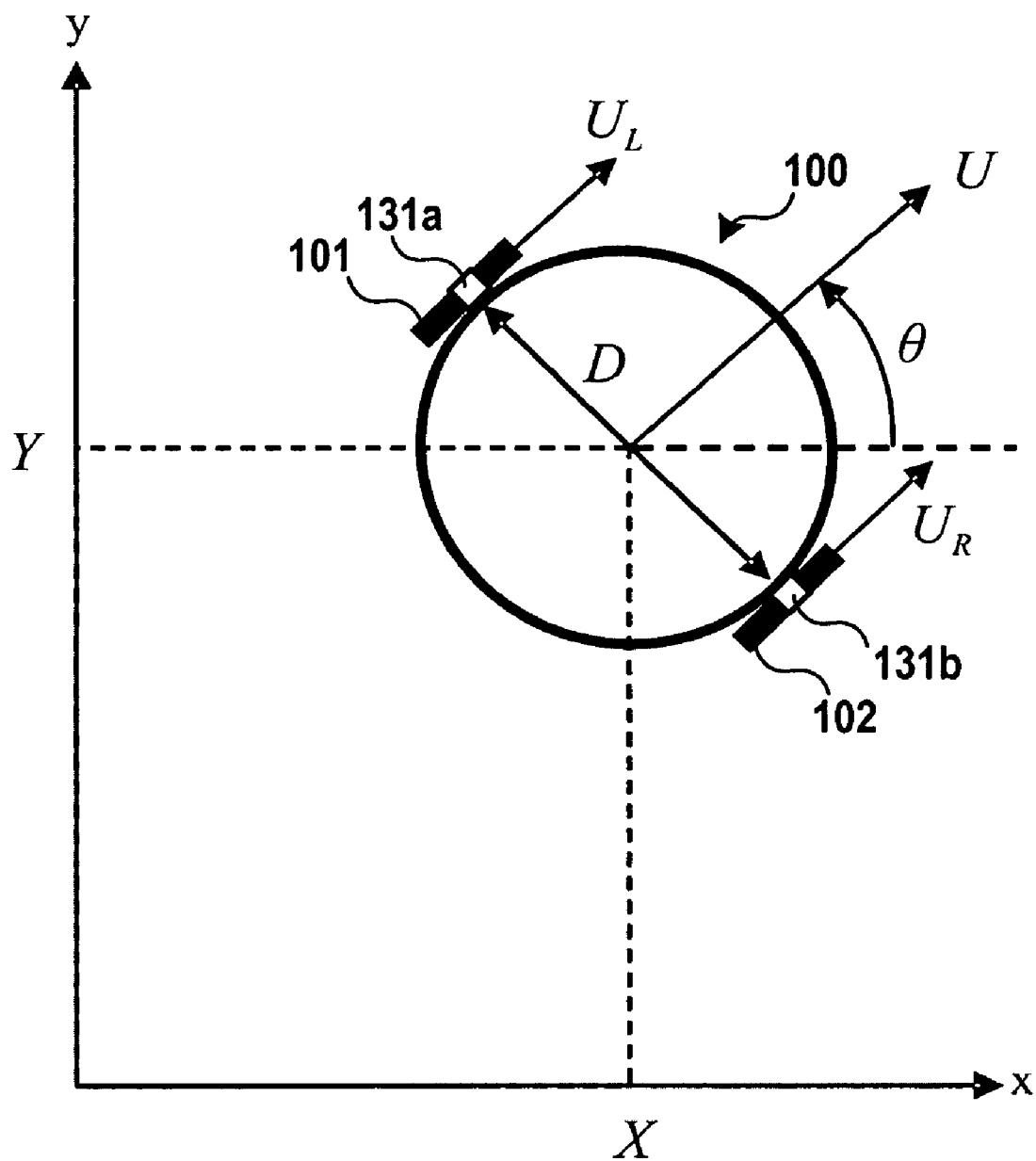
FIG. 5 is a view illustrating a conception of calculating a rotational angle using an encoder.

The encoder 131 senses the rotational velocity of the driving wheels in the driving unit 160. The linear velocities of the wheels are calculated by multiplying the rotational velocities by the wheel's radius. FIG. 5 is a view illustrating a method of calculating a rotational velocity using the encoder 120.

Encoders 131a and 131b are respectively provided to two wheels 101 and 102 of the moving robot 100. In FIG. 5, $U_L$ represents the linear velocity of the left driving wheel 101 that is measured by the encoder 131a, $U_R$ represents the linear velocity of the right driving wheel 102 that is measured by the encoder 131b, and D represents the distance between the wheels 101 and 102. Further the rotational angle from a reference line and the linear velocity of the moving robot 100 are represented by θ and U.

The rotational angular velocity of the moving robot 100 may be expressed by following Numerical Formula 1 depending on mechanical relationships.

$$\omega = \frac{U_R - U_L}{D} \quad \text{[Numerical Formula 1]}$$

The rotational angle θ is determined by integrating the ω with respect to time.

The gyroscope 132 measures the rotational angular velocity of the moving robot 100 using rotational inertia of a mass that is capable of rotating about at least one or more axes, and calculates a rotational angle by integrating the rotational angular velocity. A gyroscope may be a uniaxial, biaxial or multiaxial gyroscope that is capable of measuring the rotational angular velocity of the moving robot 100 on a plane.

The distance measuring unit 110 measures the distance between the remote control 200 and the moving robot 100. An exemplary method of measuring the distance is described herein using an electromagnetic wave, such as IR and RF, as a synchronous signal and a supersonic wave as a signal for measuring the distance.

Figure 6:
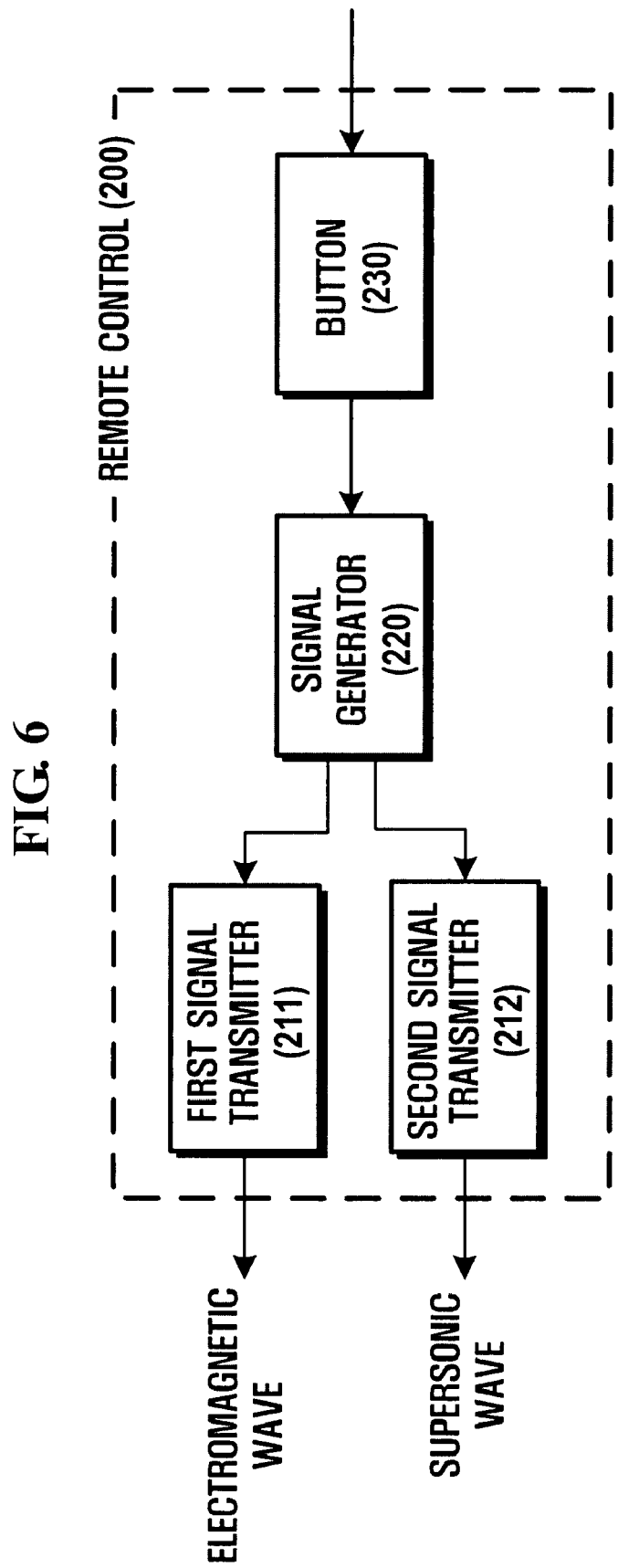
FIG. 6 is a block diagram illustrating the configuration of a remote control.

When a user presses a specific button of the remote control 200, the measuring of the distance starts. FIG. 6 is a block diagram of the configuration of the remote control 200. An input button 230 receives a button signal including a user's order about operation of localization. Subsequently, a signal generator 220 transmits an order code in the form of electromagnetic wave signal to the moving robot 100 through a first signal transmitter 211. Receiving the order code, the moving robot 100 thereafter stands by ready to receive a synchronous signal and a signal for measuring the distance.

Figure 7:
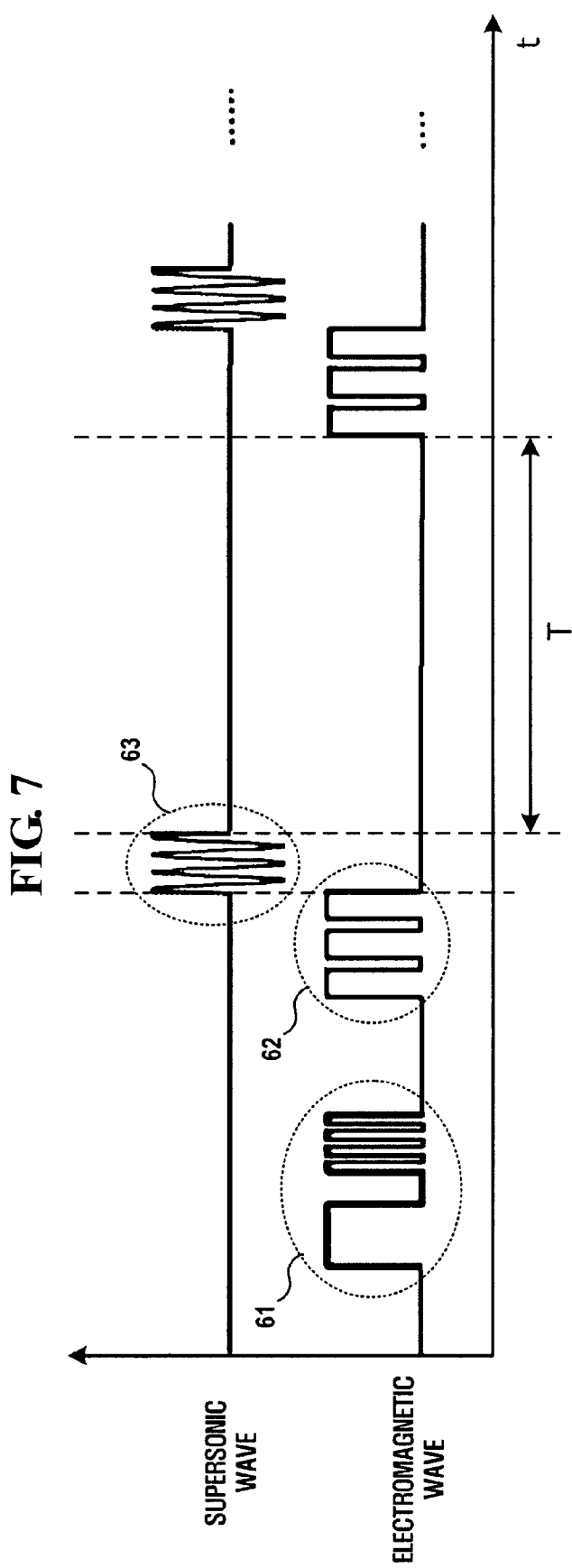
FIG. 7 is a view showing an example of an electromagnetic signal and a supersonic wave generated from a remote control.

FIG. 7 shows an example of an electromagnetic signal and a supersonic wave generated from the remote control. After the first signal transmitter 211 transmits an order code, the signal generator 220 generates a synchronous signal 62 and the first signal transmitter 211 transmits the synchronous signal 62. The signal generator 220 generates a supersonic wave 63 and the second signal transmitter 212 transmits a supersonic wave 63 upon finishing the transmission of the synchronous signal 62. A combination of the synchronous signal 62 and the supersonic wave 63 may be continually transmitted in a period of time T. The period T may be different depending on the largest measured distance and an environment of supersonic wave reverberation.

Returning to FIG. 3, the receiver 111 receives the order code 61 and the synchronous signal 62 in the form of electromagnetic wave and the sensor 112 receives the supersonic wave 63. A time difference is not given between the synchronous signal 62 and the supersonic wave 63 transmitted from the remote control 200, but the supersonic wave 63 is delayed while both signals are transmitted through the air. Accordingly, a distance calculator 113 calculates the distance between the moving robot 100 and the remote 200 using the time interval between the synchronous signal 62 transmitted to the receiver 111 and the supersonic wave 63 transmitted to the sensor 112. The distance can be simply obtained by multiplying the velocity of the supersonic wave, i.e. sound speed (about 340 m/s) by the time interval.

As shown in FIG. 4, when the sensor 112 passes at least the three measurement points $p_a$, $p_b$, $p_c$ resulting from the rotation of the moving robot 100, the data storage 140 stores a pair of data of a distance measured by the distance measuring unit 110 and a rotational angle measured by the rotational angle measuring unit 130 for each measurement point. The data storage may be a nonvolatile memory such as ROM, PROM, EPROM, EEPROM, or a flash memory, a volatile memory such as RAM, a storage medium such as hard disc or optical disc, or any other elements known in the art.

Figure 8:
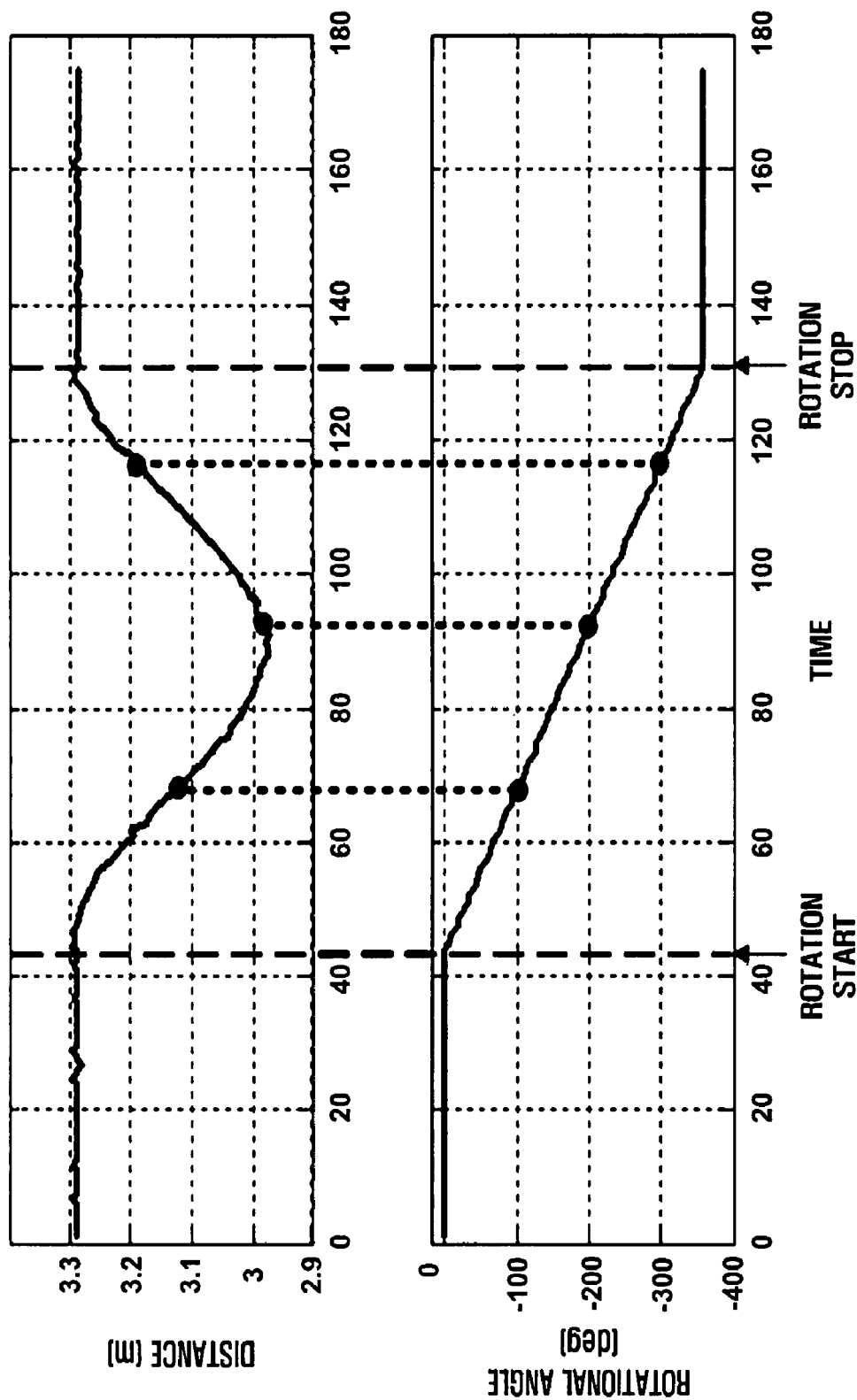
FIG. 8 is a view showing graphs of a distance and a rotational angle constructed about the same time axis.

FIG. 8 shows graphs of the distance measured by the distance measuring unit 110 and the rotational angle measured by the rotational angle measuring unit 130 that are constructed with respect to the same time axis. As for the graphs, the height of the remote control 200 was 60 cm, the distance between the remote control 200 and the center of the moving robot 100 was 3 m, and the moving robot 100 rotated clockwise at 10 cm/s.

As seen from FIG. 8, the rotational angle appears to be proportional to time, because the driving unit 160 rotated the moving robot 100 at a constant velocity. However, because the sensor 112 has only to rotate and pass the three measurement points $p_a$, $p_b$, and $p_c$, the driving unit 160 does not need to rotate the robot 100 at a constant velocity. If the three measurement points are defined at 100°, −200°, and −300°, respectively, as shown in FIG. 8, the distance corresponding to each measurement point can be found out in the graph. The data storage 140 temporarily stores combinations of a rotational angle and a distance for each measurement point and provides them to the location calculator 150.

The location calculator 150 calculates the location of the remote control 200 relative to the moving robot 100 using the rotational angles and the distances at the measurement points stored in the data storage 140. The calculation process in the location calculator 150 is described below with reference to FIGS. 9 through 11.

Figure 9:
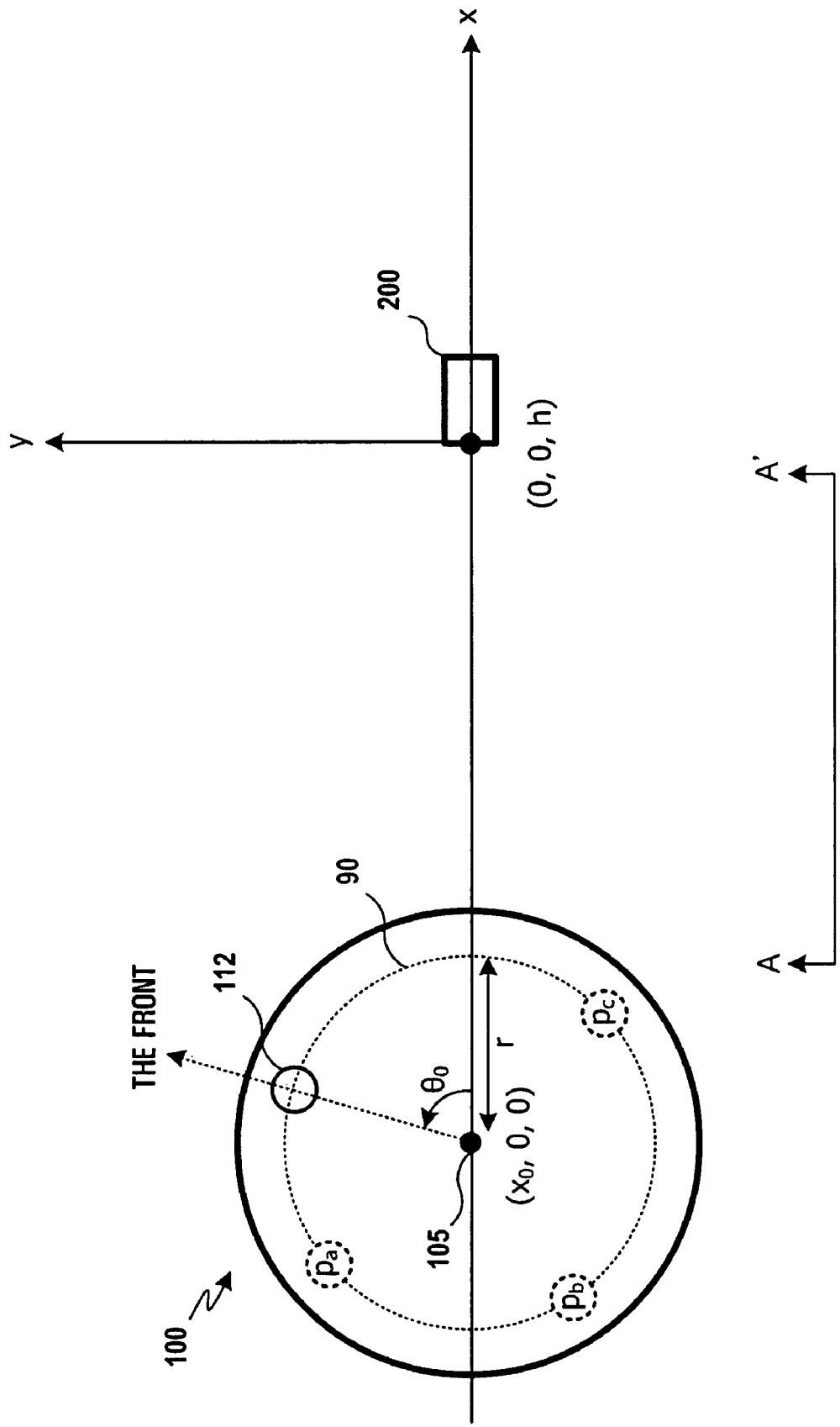
FIG. 9 is a plan view of a moving robot and a remote control.

FIG. 9 is a plan view of the moving robot 100 on the ground and the remote control 200 in the air. The location calculator 150 first sets an absolute spatial coordinate system. The absolute coordinate system is optional, but the origin is herein, as a matter of convenience, set to a point where a vertical line from the remote control 200 (more exactly, the second signal transmitter 212) meets the ground. The x-axis is set to a line passing the center 105 of the moving robot 100 and the origin, and the y- and z-axes are set accordingly. Further, the positive direction is set counterclockwise from the x-axis.

Therefore, the coordinates of the center of the moving robot 100 may be expressed by ($x_0$, 0,0) and the initial directional angle of the sensor 112 is represented by $\theta_0$. As the moving robot 100 rotates about the center 105, the sensor 112 moves along a circle 90 having a predetermined radius r. As the moving robot 100 rotates, when the sensor 112 reaches each of the measurement points $p_a$, $p_b$, $p_c$, the distance measuring unit 110 receives a synchronous signal and a supersonic wave and measures the distance between the moving robot 100 and the remote control 200.

Figure 10:
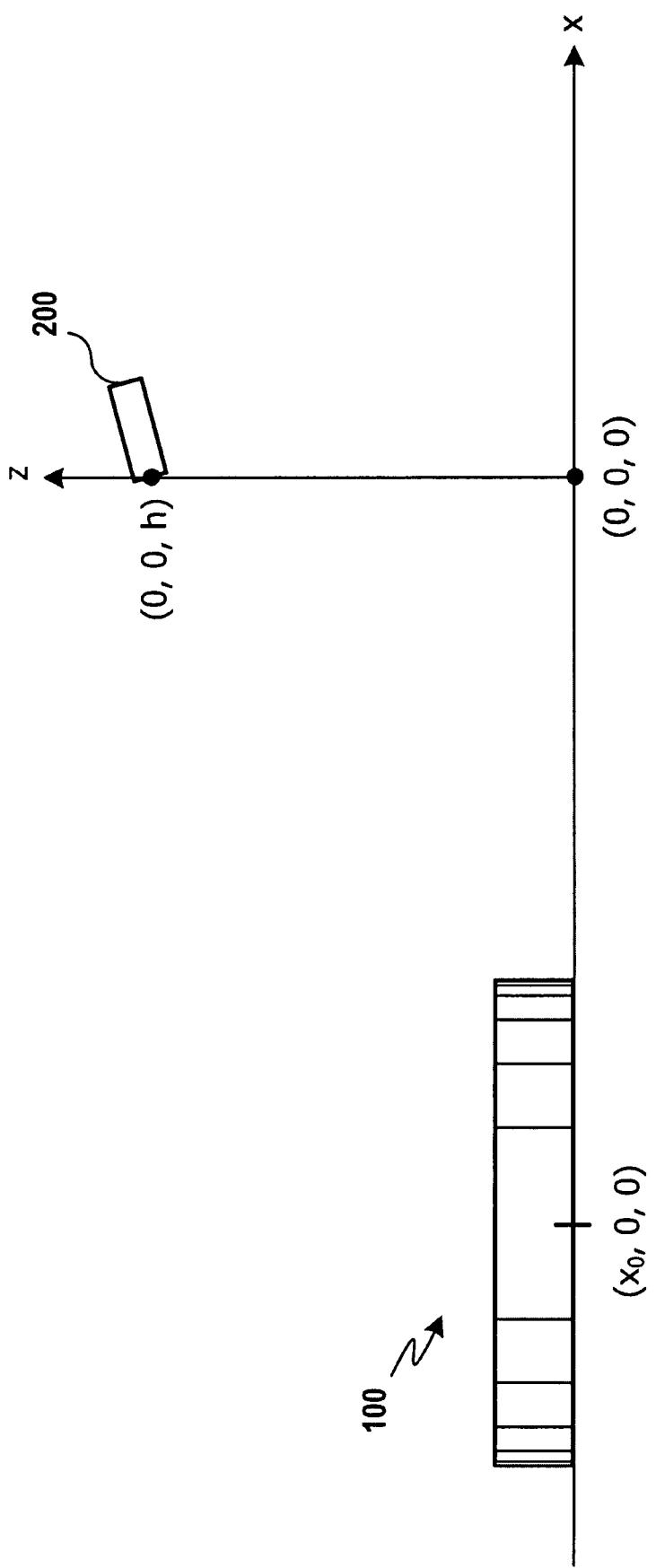
FIG. 10 is a view of the moving robot and the remote control seen from a line A-A' of FIG. 9.

FIG. 10 is a view of the moving robot 100 and the remote control 200 seen from line M'. The moving robot 100 is placed on the ground, but the remote control 200 may be placed at a predetermined height on the z-axis.

Figure 11:
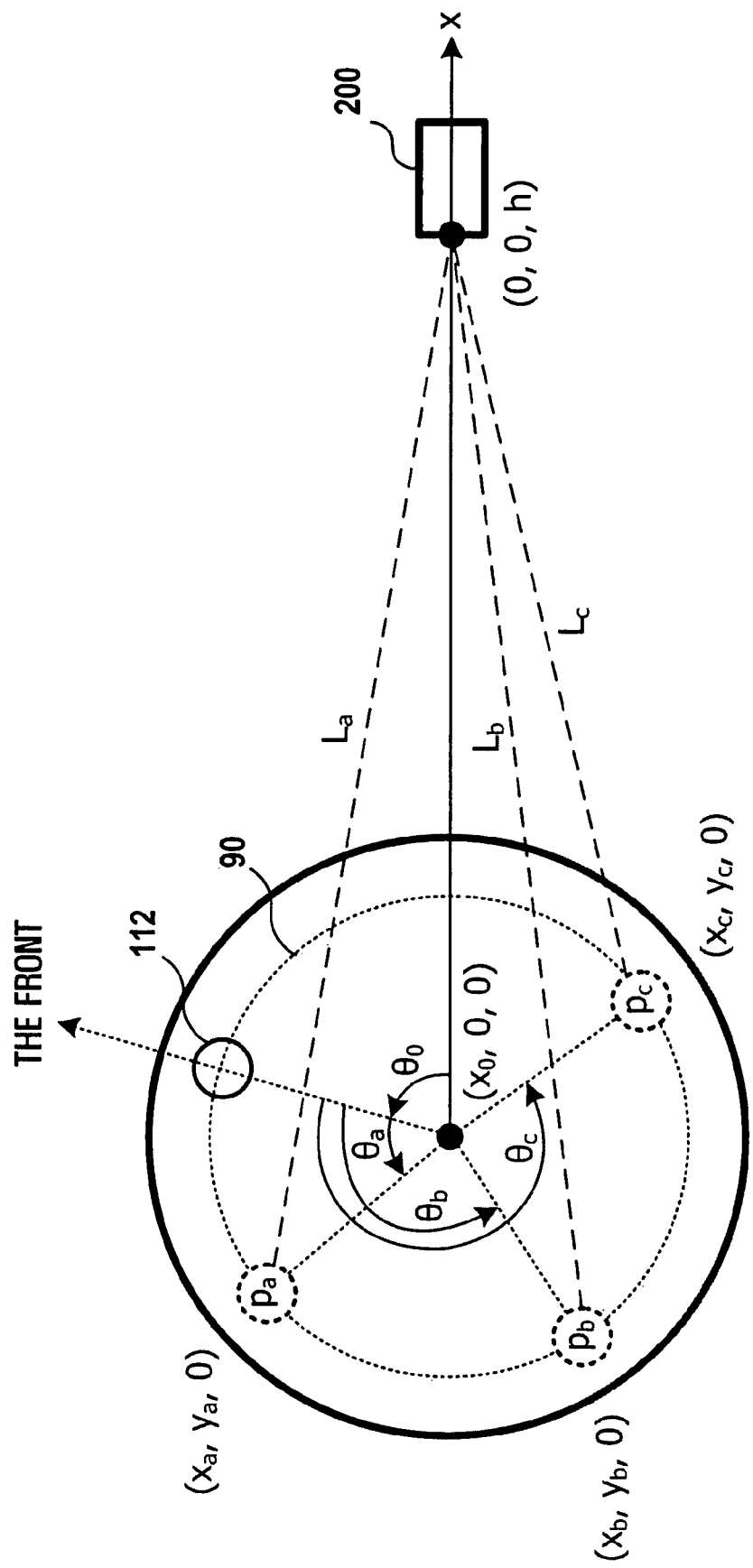
FIG. 11 is a view showing parameters when a sensor reaches measurement points.

FIG. 11 is a view showing parameters when the sensor 112 reaches each measurement points resulting from the rotation of the moving robot 100. In FIG. 11, the rotational angle at each measurement point is represented by an angle rotated from the initial directional angle $\theta_0$. At the first measurement point $p_a$, the coordinates are represented by $x_a$, $y_a$, and 0, the rotational angle is represented by $\theta_a$, and the distance from the remote control 200 is represented by $L_a$. The coordinates, rotational angle, and distance from the remote control 200 at the second and third measurement points $p_b$ and $p_c$ are represented by the same ways. The coordinates $x_a$, $y_a$, $x_b$, $y_b$, $x_c$, and $y_c$ are expressed, as in the following Numerical Formula 2, by $x_0$ of the x-coordinate of the center 105 of the moving robot 100, the rotational radius r of the sensor 112, and $\theta_a$, $\theta_b$, and $\theta_c$ of the rotational angles for each measurement point.

$$x_a = x_0 + r \cdot \cos(\theta_0 + \theta_a)$$

$$y_a = r \cdot \sin(\theta_0 + \theta_a)$$

$$x_b = x_0 + r \cdot \cos(\theta_0 + \theta_b)$$

$$y_b = r \cdot \sin(\theta_0 + \theta_b)$$

$$x_c = x_0 + r \cdot \cos(\theta_0 + \theta_c)$$

$$y_c = r \cdot \sin(\theta_0 + \theta_c) \quad \text{[Numerical Formula 2]}$$

The measurement points $p_a$, $p_b$, and $p_c$ and the distances $L_a$, $L_b$, and $L_c$ may be expressed as the following Numerical Formula 3, $$L_a^2 = x_a^2 + y_a^2 + h^2$$

$$L_b^2 = x_b^2 + y_b^2 + h^2$$

$$L_c^2 = x_c^2 + y_c^2 + h^2 \quad \text{[Numerical Formula 3]}$$

where, h is the height of the remote control 200, i.e. the z-axis coordinate.

Substituting the coordinates $x_a$, $y_a$, $x_b$, $y_b$, $x_c$, and $y_c$ in Numerical Formula 2 for the terms in Numerical Formula 3, three simultaneous equations expressed by three variables of $x_0$, $\theta_0$, and h can be obtained, where $x_0$ and h are limited to a negative and a positive, respectively. The terms $\theta_a$, $\theta_b$, and $\theta_c$ and $L_a$, $L_b$, and $L_c$ are constants in the simultaneous equations, because they are measured by the rotational angle measuring unit 130 and the distance measuring unit 110, respectively. As a result, the location calculator 150 can determine the only one value for each of the variable $x_0$, $\theta_0$, and h simultaneously from the equations.

The location of the remote control 200 relative to the moving robot 100 is obtained from the determined coordinates $x_0$ and $\theta_0$ (where, h is unnecessary, because the moving robot is placed on the ground), so that the motion controller 120 controls the driving unit 160 such that the moving robot 100 returns to the remote control 200 and a user. For example, the motion controller 120 may control the driving unit 160 such that the moving robot 100 turns to the remote control 200 and travels the distance $|x_0|$.

According to the above exemplary embodiment, the location of the remote control 200 is calculated by three measurement points. However, more measurement points may be used for more exact calculation. For example, as the moving robot 100 rotates, if the distance and the rotational angle are measured for n measurement points, Numerical Formulas 2 and 3 are operated for triangles formed by any three measurement points of the n measurement points and then representative values (averages, intermediate values) for the obtained plurality of values $x_0$ and $\theta_0$ may be obtained.

Figure 12:
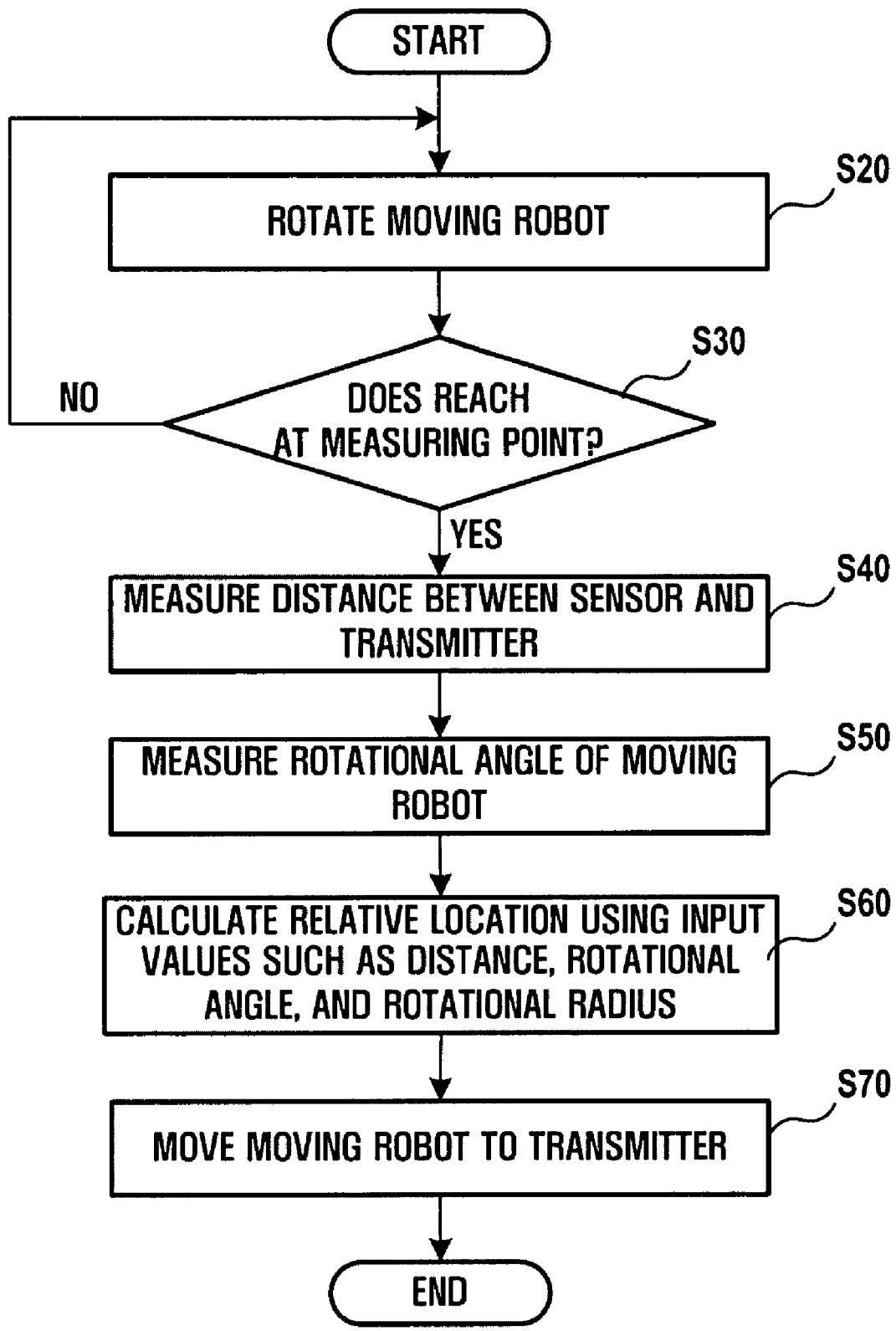
FIG. 12 is a flowchart illustrating a method of localizing according to an exemplary embodiment.

FIG. 12 is a flowchart showing a method of localizing according to an exemplary embodiment.

As the moving robot 100 is rotated by the motion controller 120 (S20), when the sensor 112 reaches a measurement point of a plurality of measurement points (at least three measurement points) (Yes in S30), the distance measuring unit 110 measures the distance between the sensor and a predetermined signal generator at the measurement points using the sensor 112 that senses a predetermined wave (e.g. supersonic wave) generated from the signal generator (S40).

In order to measure the distance, the distance measuring unit 110 may further include the receiver 111 that receives a synchronous signal (transmitted in the form of IR or RF) out of the signal generator and the distance calculator 113 that calculates the distance from delay time between the synchronous signal and the wave.

On the other hand, the rotational angle measuring unit 130 measures the rotational angle for the measurement point where the sensor 112 reaches (S50). For the measurement of the rotational angle, the rotational angle measuring unit 130 may include at least one of the encoder 131 and the gyroscope 132. The gyroscope 132 measures an angular velocity using rotating inertial mass and the encoder 131 measures an angular velocity by dividing the difference of both driving wheels' linear velocities by the distance between the driving wheels.

Further, the location calculator 150 calculates the relative location using input values, i.e. the measured distance and rotational angle, and the radius of a circle determined by the sensor resulting from the rotation of the moving robot 100 (S60).

In order to calculate the relative location, the location calculator 150 sequentially performs operations including finding numerical formulas that expresses the coordinates of the plurality of measurement points into distance between the center of the moving robot and the signal generator, the initial directional angle of the moving robot, and the rotational angle for the positions; finding numerical formulas that expresses the distance between the measurement points and the signal generator into coordinates; and calculating the distance between the center of the moving robot and the signal generator and the initial directional angle of the moving robot by finding the solutions of simultaneous equations of the obtained numerical formulas.

Finally, the motion controller 120 may control the moving robot 100 such that the moving robot 100 approaches the signal generator depending on the calculated relative locations (S70).

The following Table 1 shows the result of a test applied to an exemplary embodiment, where the height h of the remote control 200 was 60 cm, the horizontal distance $|x_0|$ between the remote control 200 and the moving robot 100 was 1 m, 2 m, 3 m, respectively, the rotational velocity of the moving robot 100 was 5 cm/s, and the rotational radius r of the moving robot 100 was 10 cm.

TABLE 1

| Error | 1 m | 2 m | 3 m | Average |
|---|---|---|---|---|
| Range Error (cm) | 7.667 | 14.57 | 3.14 | 8.46 |
| Angular Error (deg) | 0.910 | 1.12 | 0.94 | 0.98 |

As seen from Table 1, the range error and the angular error are not more than 10 cm and 1 degree, so that an exemplary embodiment may be sufficiently practical when used indoors where the distance between the moving robot 100 and the remote control 200 is not too far.

In the above exemplary embodiment, it was assumed that the sensor 112 is an omni-directional sensor not depending on a direction. However, if the sensor 112 is a directional sensor that can receive a supersonic wave within a fixed angle of view only, some algorithms are additionally needed for the motion of the motion controller 120, because, for example, in FIG. 4, if the sensor 112 is a directional sensor, the measurement points $p_a$, $p_b$, $p_c$ can not be arbitrarily selected and should be within an angle of view of the remote control 200, i.e. a measurable rotational angle.

Figure 13:
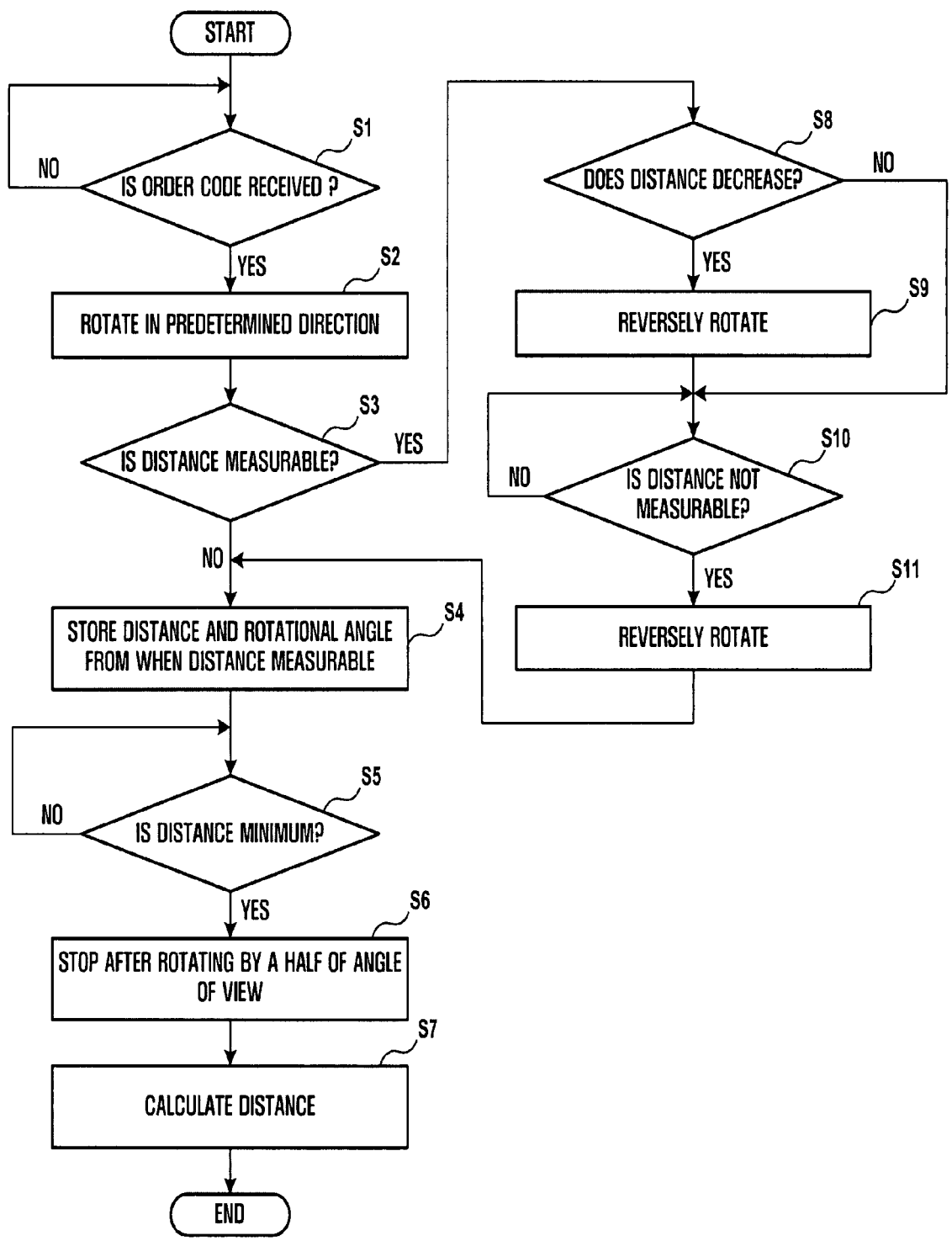
FIG. 13 is a flowchart illustrating algorithms for measuring a distance and a rotational angle for each measurement point in a robot having a directional supersonic sensor.

FIG. 13 is a flowchart showing an algorithm for measuring a distance and a rotational angle for each measurement point for the moving robot 100 having directional sensors.

First, the receiver 111 receives an order code from the remote control 200 (Yes in S1), and then the motion controller 120 controls the driving unit 160 to rotate the moving robot 100 in a predetermined direction (clockwise or counterclockwise) (S2).

The distance measuring unit 110 checks whether the sensor 112 can receive a supersonic wave transmitted from the remote control 200 at the same time the rotation, and if not (No in S3), the moving robot 100 keeps rotating in the predetermined direction and the data storage 140 continually stores distances and rotational angles from when the distance can be measured (S4).

In S3, if it is possible to measure the distance (Yes in S3), whether the distance decreases during the rotation is checked. When it is determined that the distance decreases (Yes in S8), the motion controller 120 controls the moving robot 100 such that it rotates reversely to the predetermined rotational direction (S9), thereafter, a point where it is impossible to measure the distance (S10) is set to a first end point in the angle of view and the rotational angle at the point is stored in the data storage 113. The motion controller 120 then controls the moving robot 100 such that it rotates reversely to the predetermined direction (S11).

When it is determined that the distance does not decrease in S8 (No in S8), the motion controller 120 controls the moving robot 100 such that it keeps rotating in the predetermined direction. A point where it is impossible to measure the distance is set to a first end point in the angle of view and the rotational angle at the point is stored in the data storage 140. The motion controller 120 then controls the moving robot 100 such that it rotates reversely to the predetermined direction (S11).

The data storage 140 continually stores distances and rotational angles during the rotation in S11. The distances and the rotational angles are provided from the distance measuring unit 110 and the rotational angle measuring unit 130, respectively.

If the minimum distance is reached during the rotation in S2 or S11 (Yes in S5), it implies that the front of the moving robot 100 faces the remote control 200, so that the motion controller 120 controls the moving robot 100 such that it stops after rotating by a half of the angle of view from the minimum distance point, holding the rotational direction before (S6). After the moving robot 100 stops, the location calculator 150 calculates the location of the remote control 200 relative to the moving robot 100 from relationships between the stored distances and the rotational angles using at least three or more points as measurement points.

In the above exemplary embodiment, a method of calculating the locations of a remote control and a user relative to a moving robot was described. However, a method of calculating the location of a moving robot relative to a beacon placed at a fixed location instead of a user is also contemplated, because the difference between the methods is just what the reference is, but the technical configurations are similar or the same.

In addition to the above-described exemplary embodiments, exemplary embodiments can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of embodiments, or they may be of the kind well-known and available to those skilled in the art of computer hardware and/or computer software.

According to exemplary embodiments of the invention, a robot can localize a user and move thereto using single supersonic sensor. Accordingly, manufacturing cost of a robot can be reduced and errors due to different sensitivities of several supersonic sensors can be removed.

Although a few exemplary embodiments have been shown and described, it would be appreciated by those skilled in the art that changes may be made in these exemplary embodiments without departing from the principles and spirit of embodiments, the scope of which is defined in the claims and their equivalents.

What is claimed is:

1. An apparatus for localizing a moving robot and a transmitter using a single sensor provided in the moving robot, the apparatus comprising:
    a motion controller to control the moving robot such that the sensor passes a plurality of measurement points by rotating the moving robot;
    a distance measuring unit, which includes the sensor that senses predetermined waves generated from the transmitter, to measure distances between the sensor and the transmitter at the plurality of measurement points at each localizing location;
    a rotational angle measuring unit to measure rotational angles of the moving robot at the measurement points; and
    a location calculator to calculate location of the transmitter relative to the moving robot or location of the moving robot relative to the transmitter using input values including the measured distances, the measured rotational angles, and a radius of a circle determined by the sensor resulting from the rotation of the moving robot,
    wherein the measurement points are at least three or more points on the circumference of the circle determined by the sensor.

2. The apparatus of claim 1, wherein the wave is a supersonic wave.

3. The apparatus of claim 1, wherein the distance measuring unit comprises a receiver to receive synchronous signals out of the transmitter, and a distance calculating unit to calculate distances from delayed time between the synchronous signals and the waves.

4. The apparatus of claim 3, wherein the synchronous signal is an infra-red (IR) signal.

5. The apparatus of claim 3, wherein the synchronous signal is a radio frequency (RF) signal.

6. The apparatus of claim 1, wherein the transmitter is a remote control.

7. The apparatus of claim 1, wherein the rotational measuring unit comprises an encoder.

8. The apparatus of claim 7, wherein the encoder measures the rotational angle by dividing the difference of the linear velocities of both driving wheels of the moving robot by the distance between the driving wheels.

9. The apparatus of claim 1, wherein the location calculator calculates distances between the center of the moving robot and the transmitter, and the initial rotational angle of the moving robot by finding solutions of simultaneous equations of formulas expressing the coordinates of the measurement points with the distances between the center of the moving robot and the transmitter, the initial directional angle of the moving robot, and the rotational angles at the measurement points, and formulas expressing the distances between the measurement points and the transmitter into the coordinates.

10. The apparatus of claim 1, wherein the motion controller controls the moving robot such that the moving robot approaches the transmitter according to the calculated relative locations.

11. The apparatus of claim 1, wherein when the sensor is a directional sensor, the motion controller determines a measurable rotational angle range by checking whether the wave is sensed by the sensor while controlling the rotation of the moving robot.

12. The apparatus of claim 11, wherein the measurement points are set within the measurable rotational angle range.

13. A method of localizing a moving robot and a transmitter using a single sensor provided to the moving robot, the method comprising:
controlling the moving robot such that the sensor passes measurement points by rotating the moving robot;
measuring distances between the sensor and the transmitter at the measurement points at each localizing location using the sensor that senses predetermined waves generated from the transmitter;
measuring rotational angles of the moving robot at the measurement points; and
calculating location of the transmitter relative to the moving robot or location of the moving robot relative to the transmitter using input values including the measured distances, the measured rotational angles, and a radius of a circle determined by the sensor resulting from the rotation of the moving robot,
wherein the measurement points are at least three or more points on the circumference of the circle determined by the sensor.

14. The method of claim 13, wherein the wave is a supersonic wave.

15. The method of claim 13, wherein the measuring of the distances comprises receiving synchronous signals out of the transmitter, and calculating the distances from delayed time between the synchronous signals and the waves.

16. The method of claim 15, wherein the synchronous signal is an infra-red (IR) signal.

17. The method of claim 15, wherein the synchronous signal is a radio frequency (RF) signal.

18. The method of claim 13, wherein the transmitter is a remote control.

19. The method of claim 13, wherein the measuring of the rotational angle uses an encoder.

20. The method of claim 19, wherein the encoder measures the rotational angle by dividing the difference of the linear velocities of both driving wheels of the moving robot by the distance between the driving wheels.

21. The method of clam 13, wherein the calculating of the relative locations comprises:
finding formulas expressing the coordinates of the measurement points into distances between the center of the moving robot and the transmitter, the initial directional angle of the moving robot, and the rotational angles at the measurement points;
finding formulas expressing the distances between the measurement points and the transmitter into the coordinates; and
calculating the distances between the center of the moving robot and the transmitter and the rotational angles of the moving robot by finding solutions of simultaneous equations of the formulas.

22. The method of claim 13, further comprising controlling the moving robot such that the moving robot approaches the transmitter according to the calculated relative locations.

23. The method of claim 13, further comprising determining a measurable rotational angle range by checking whether the wave is sensed by the sensor while controlling the rotation of the moving robot, when the sensor is a directional sensor.

24. The method of claim 23, wherein the measurement points are set within the measurable rotational angle range.

25. The apparatus of claim 1, wherein the rotational measuring unit comprises a gyroscope.

26. The method of claim 13, wherein the measuring of the rotational angle uses a gyroscope.

27. At least one nontransitory computer readable medium storing computer readable instructions that control at least one processor to implement the method of claim 13.

* * * * *

UNITED STATES PATENT AND TRADEMARK OFFICE
CERTIFICATE OF CORRECTION

| | | |
|---|---|---|
| PATENT NO. | : 8,060,256 B2 | Page 1 of 1 |
| APPLICATION NO. | : 11/822438 | |
| DATED | : November 15, 2011 | |
| INVENTOR(S) | : Dong-geon Kong et al. | |

It is certified that error appears in the above-identified patent and that said Letters Patent is hereby corrected as shown below:

Column 12, Line 19, In Claim 21, delete "clam" and insert -- claim --, therefor.

Signed and Sealed this
Fourteenth Day of February, 2012

David J. Kappos
*Director of the United States Patent and Trademark Office*